(12) United States Patent  
Kim

(10) Patent No.: US 8,040,484 B2  
(45) Date of Patent: Oct. 18, 2011

(54) LIQUID CRYSTAL DISPLAY PANEL HAVING A CONSTANT CELL GAP AND METHOD OF MAKING THE SAME

(75) Inventor: Sang-il Kim, Gyeonggi-do (KR)

(73) Assignee: Samsung Electronics Co., Ltd. (KR)

( * ) Notice: Subject to any disclaimer, the term of this patent is extended or adjusted under 35 U.S.C. 154(b) by 450 days.

(21) Appl. No.: 11/406,571

(22) Filed: Apr. 18, 2006

(65) Prior Publication Data

US 2006/0274220 A1  Dec. 7, 2006

(30) Foreign Application Priority Data

Jun. 1, 2005 (KR) .................. 10-2005-0046770

(51) Int. Cl.  
G02F 1/1339 (2006.01)  
G02F 1/1333 (2006.01)

(52) U.S. Cl. .................. 349/155; 349/110

(58) Field of Classification Search .......... 349/155–156, 349/110, 139  
See application file for complete search history.

(56) References Cited

U.S. PATENT DOCUMENTS

| | | | |
|---|---|---|---|
| 6,266,121 B1 | 7/2001 | Shigeta et al. | |
| 6,396,559 B1 * | 5/2002 | Kishimoto et al. | 349/156 |
| 7,142,277 B2 * | 11/2006 | Choi et al. | 349/155 |
| 7,518,696 B2 * | 4/2009 | Jang et al. | 349/155 |
| 2003/0002004 A1 * | 1/2003 | Kouya | 349/155 |
| 2005/0099580 A1 * | 5/2005 | Lee et al. | 349/156 |
| 2005/0146669 A1 * | 7/2005 | Yeh et al. | 349/141 |

FOREIGN PATENT DOCUMENTS

| | | |
|---|---|---|
| JP | 61-123817 A | 6/1986 |
| JP | 64-018126 | 1/1989 |
| JP | 64-033524 | 2/1989 |
| JP | 01-271725 | 10/1989 |
| JP | 02-201424 | 8/1990 |
| JP | 05-264982 | 10/1993 |
| JP | 06-331970 | 12/1994 |
| JP | 11-002822 | 1/1999 |
| JP | 11-183915 | 7/1999 |
| JP | 11237639 A | 8/1999 |
| JP | 11-344711 A | 12/1999 |
| JP | 2000122071 A | 4/2000 |
| JP | 2001-083906 A | 3/2001 |
| JP | 2001-305561 | 10/2001 |
| JP | 2002341355 | 11/2002 |
| JP | 2003-121859 A | 4/2003 |
| JP | 2004-012772 | 1/2004 |
| JP | 2004-077700 | 3/2004 |
| JP | 2004-205549 A | 7/2004 |
| JP | 2004-295109 | 10/2004 |
| JP | 2004287058 A | 10/2004 |
| JP | 2005084231 A | 3/2005 |

(Continued)

Primary Examiner — Dung T. Nguyen  
(74) Attorney, Agent, or Firm — Innovation Counsel LLP

(57) ABSTRACT

An LCD panel that provides improved image quality by preventing light leakage and maintaining constant cell gap is provided, along with a method of making the LCD panel. The LCD panel includes a first member that has a column spacer, a second member that is positioned substantially parallel to the first member, and a polymer layer disposed between the column spacer and the second member. The polymer layer combines the column spacer with the second member. A liquid crystal layer is disposed between the first member and the second member.

15 Claims, 15 Drawing Sheets

FOREIGN PATENT DOCUMENTS

| | | |
|---|---|---|
| JP | 2006-084906 A | 3/2006 |
| KR | 10-1998-0042841 A | 8/1998 |
| KR | 10-2004-0042275 A | 5/2004 |
| KR | 2005-0005637 | 1/2005 |
| TW | 200401135 A | 1/2004 |
| TW | 586046 B | 5/2004 |
| WO | 2005/015294 A1 | 2/2005 |

* cited by examiner

LIQUID CRYSTAL DISPLAY PANEL HAVING A CONSTANT CELL GAP AND METHOD OF MAKING THE SAME

CROSS-REFERENCE TO RELATED APPLICATIONS

This application claims the benefit of Korean Patent Application No. 2005-0046770 filed on Jun. 1, 2005 in the Korean Intellectual Property Office, the disclosure of which is incorporated herein by reference.

BACKGROUND OF THE INVENTION

1. Field of the Invention

The present invention relates to a liquid crystal display panel and a method of making the same, and more particularly to a liquid crystal display panel with a constant cell gap between two substrates.

2. Description of the Related Art

An LCD (liquid crystal display) device includes an LCD panel having a TFT (Thin Film Transistor) substrate on which TFTs are formed, a color filter substrate on which a color filter layer is formed and a liquid crystal layer interposed between the two substrates. Since the LCD panel does not emit light by itself, the LCD may include a backlight unit disposed in the rear of the TFT substrate. The transmittance of the light generated by the backlight unit as it passes through the LCD depends on the alignment of liquid crystals in the liquid crystal layer.

The LCD also comprises a driving circuit applying a driving signal to a gate line and a data line formed on the TFT substrate in order to form a screen on a display area. The driving circuit includes a gate driving chip, a data driving chip and a printed circuit board on which a timing controller and a driving voltage generating part are formed.

Optical characteristic of the LCD panel is closely related to the cell gap in the liquid crystal layer formed between the two substrates. Specifically, the contrast and the angular field are known to depend upon multiplication of the birefringence $\Delta n$ of the liquid crystal and the cell gap. Therefore, when the cell gap of the LCD panel is not constant, the optical characteristic is not constant either.

The cell gap becomes irregular when the LCD panel gets bent. Bending of the LCD panel is especially problematic when a flexible material such as plastic is used for the substrate. A method of maintaining a constant cell gap in an LCD made with flexible substrate is desired to ensure stable optical characteristics and quality images.

SUMMARY OF THE INVENTION

Accordingly, it is an aspect of the present invention to provide an LCD panel in which a constant cell gap is maintained.

Another aspect of the present invention is to provide a method of making the LCD panel with a constant cell gap.

The foregoing and/or other aspects of the present invention are achieved by providing an LCD panel that includes a first member including a column spacer, a second member disposed substantially parallel to the first substrate, a polymer layer disposed between the column spacer and the second member, the polymer layer combining the column spacer with the second member, and a liquid crystal layer disposed between the first member and the second member.

At least one of the first member and the second member may be provided with an insulating substrate made of plastic.

A TFT may be formed on the first member, and the insulating substrate of the second member may be made of plastic.

The LCD panel may also include a first alignment layer disposed between the column spacer and the polymer layer.

The second member may include an insulating substrate and a common electrode layer and a second alignment layer which are formed sequentially on the insulating substrate, and the polymer layer is formed on the second alignment layer.

Caved-in parts may be dispersed on the second member and the polymer layer is disposed in the caved-in parts.

A black matrix may be formed on the second member in the lattice shape and the caved-in parts may be formed on the black matrix.

The black matrix may be removed from the caved-in parts.

The black matrix may include an organic substance.

The second member may also include an overcoat layer and the caved-in parts may be formed on the overcoat layer.

A metal pattern may be formed on an area of the first member that aligns with the caved-in parts when the first member and the second member are aligned to reduce light leakage.

The polymer layer may include acryl resin and epoxy resin.

The polymer layer may include an ultraviolet hardening resin.

The LCD panel also includes a sealant combining the first member with the second member and an ultraviolet hardening resin.

The foregoing and/or other aspects of the present invention are also achieved by providing a method of making an LCD panel. The method includes forming a first member on which a column spacer, forming a pre-polymer layer on a second member such that the pre-polymer aligns with the column spacer upon alignment of the first member and the second member, disposing the first member on the second member so that the column spacer aligns with the pre-polymer layer; and hardening the pre-polymer layer.

At least one of the first member and the second member may be provided with an insulating substrate made of plastic.

The method may also include forming the second member by forming a caved-in part dispersed on the insulating substrate and disposing the pre-polymer layer in the caved-in part.

Forming the second substrate may include forming a common electrode layer and an alignment layer sequentially on an insulating substrate and disposing the pre-polymer layer on the alignment layer.

The pre-polymer layer may be hardened by ultraviolet radiation.

The pre-polymer layer may be formed by an ink-jet method.

The method of making the LCD panel may also include forming a sealant along the edges of the first member and the second member and hardening the polymer layer and the sealant at the same time.

The method may also include forming a sealant along the edges of the first member and the second member, hardening the pre-polymer layer and the sealant after disposing the first member substantially parallel to the second member, and forming a liquid crystal layer between the first member and the second member after hardening the pre-polymer layer and the sealant.

The method of making the LCD panel may also include forming a sealant along the edges of the first member and the second member and forming a liquid crystal layer by using a dropping method on the substrate on which the sealant is formed.

BRIEF DESCRIPTION OF THE DRAWINGS

The above and/or other aspects and advantages of the present invention will become apparent and more readily appreciated from the following description of the exemplary embodiments, taken in conjunction with the accompanying drawings of which.

DETAILED DESCRIPTION OF THE EMBODIMENT

Figure 1:
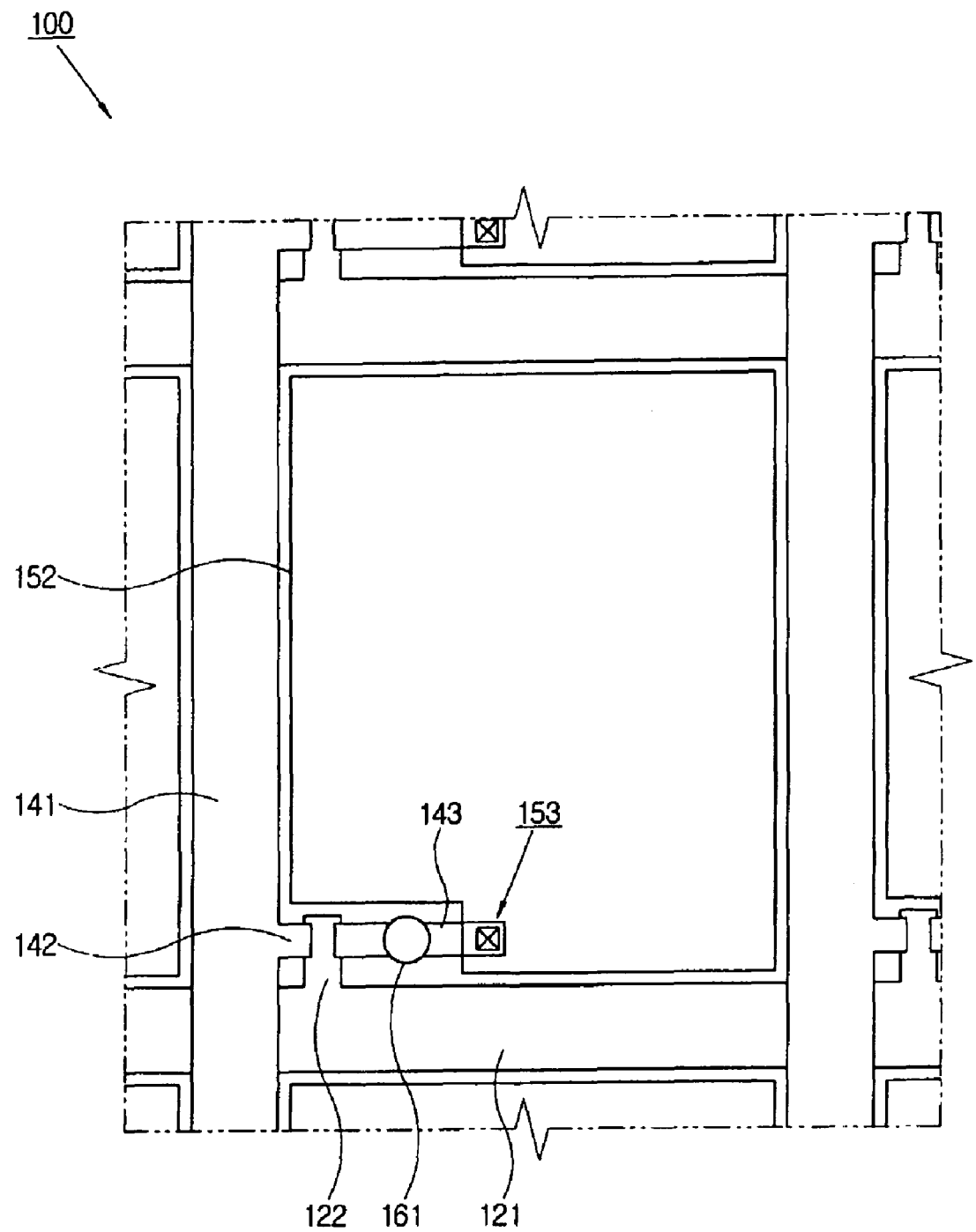
FIG. 1 is a plan view of a first member according to a first embodiment of the present invention.

References will now be made in detail to exemplary embodiments of the present invention illustrated in the accompanying drawings, wherein like reference numerals refer to like elements throughout. The embodiments are described below in order to explain the present invention by referring to the figures.

Figure 2:
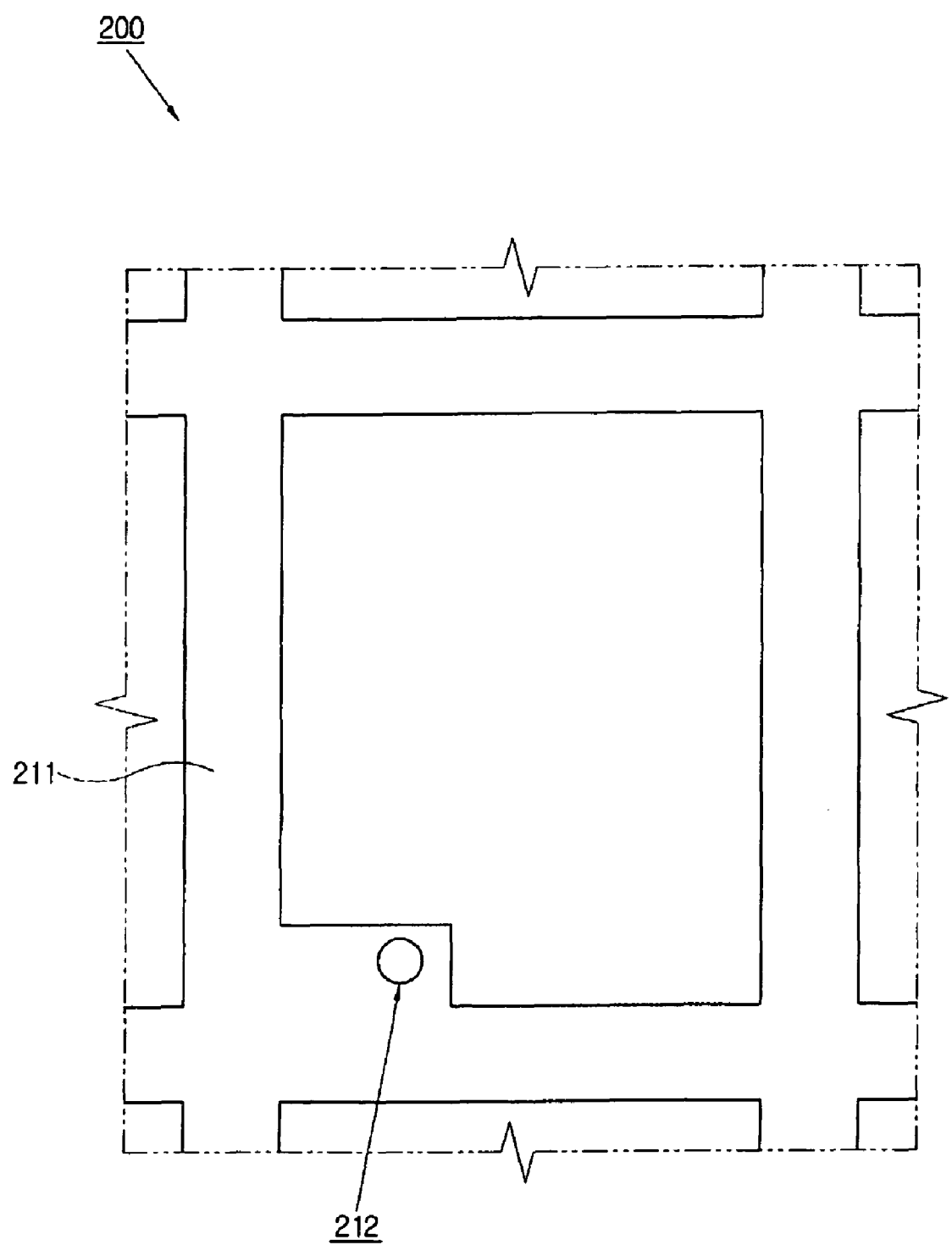
FIG. 2 is a plan view of a second member according to the first embodiment of the present invention.
Figure 3:
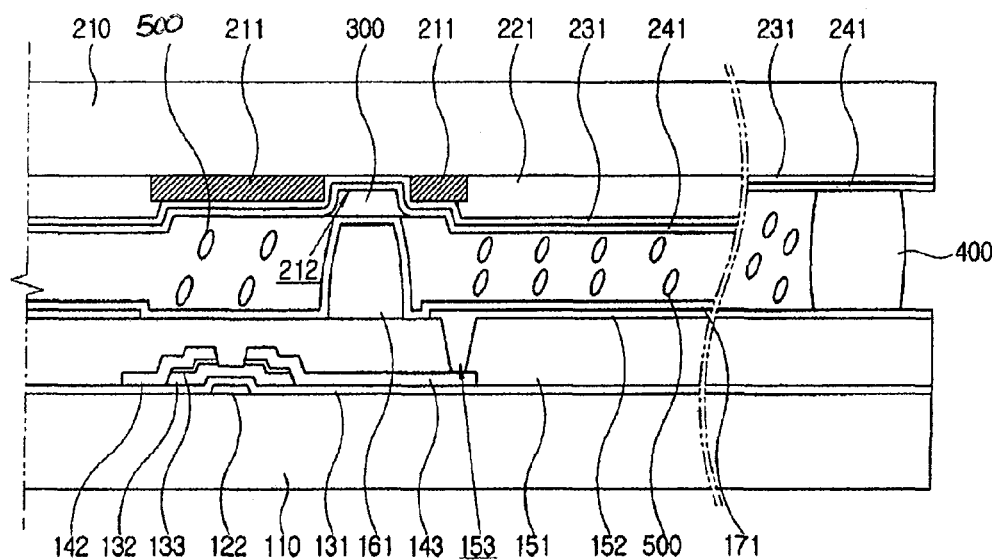
FIG. 3 is a sectional view of an LCD panel according to the first embodiment of the present invention.

An LCD panel according to a first embodiment of the present invention will be described with reference to FIGS. 1 through 3. FIG. 1 is a plan view of a first member 110, FIG. 2 is a plan view of a second member 200 and FIG. 3 is a sectional view of the LCD panel according to the first embodiment of the present invention.

The LCD panel 1 includes the first member 100 on which a column spacer 161 is formed, the second member 200 disposed facing the first member 100, a polymer layer 300 disposed between the column spacer 161 and the second member 200, a sealant adhering the two members 100, 200 and a liquid crystal layer 500 disposed in a space which the two members 100, 200 and the sealant 400 form.

The first member 100 will now be described. A gate line assembly is formed on a first insulating substrate 110. The gate line assembly includes a gate line 121 extending in a first direction and a gate electrode 122 of a TFT connected to the gate line 121.

A gate insulating layer 131 made of silicon nitride (SiNx) or the like is formed on the first insulating substrate 110, the gate line 121, and the gate electrode 122. On the gate insulating layer 131 of the gate electrode 122 is formed a semiconductor layer 132 made of amorphous silicon or the like. On the semiconductor layer 132 is formed ohmic contact layer 133 made of n+ hydrogenated amorphous silicon highly-doped with n-type dopant. The semiconductor layer 132 is formed like an island on the gate electrode 122. The ohmic contact layer 133 is divided into two parts separated by the gate electrode 122.

A data line assembly is formed on the ohmic contact layer 133 and the gate insulating layer 131. The data line assembly includes a data line 141, a source electrode 142, and a drain electrode 143. The data line 141 is formed to extend in a second direction substantially perpendicular to the first direction. The data line 141 and the gate line 121 define a pixel. The source electrode 142 branches from the data line 141 and extends over an upper part of the ohmic contact layer 133. The drain electrode 143 is separated from the source electrode 142 and formed across the gate electrode 122 from the source electrode 142.

A protective layer 151 is formed on the data line assembly (141, 142, 143) and on the portion of the semiconductor layer 132 which is not covered with the data line assembly. The protective layer 151 is made of a SiNx layer, an a-Si:C:O layer or an a-Si:O:F layer, any of which may be formed through suitable conventional methods such as PECVD (plasma enhanced chemical vapor deposition) or an acryl-based organic insulating layer. A contact hole 153 is formed on the protective layer 151 through which the drain electrode 143 is exposed.

A pixel electrode 152 is formed on the protective layer 151. The pixel electrode 152 is made of ITO (indium tin oxide) or IZO (indium zinc oxide) and is connected to the drain electrode 143 through the contact hole 153.

The column spacer 161 is formed on the protective layer 151 and is projected to the second member 200. The column spacer 161, which is usually manufactured by patterning an organic layer, maintains a cell gap between the first member 100 and the second member 200. The column spacer 161 is preferably formed on an area that is covered with a black matrix 211 of the second member 200 when the first and second members are combined. The column spacer 161 being aligned with the black matrix 211 prevents a decrease of the aperture ratio.

A first alignment layer 171 is formed on the pixel electrode 152 and the column spacer 161. The first alignment layer 171 is usually made of polyimide and is rubbed to align the liquid crystal molecules in a regular direction.

The second member 200 that is disposed facing the first member 100 will now be explained.

The second member 200 includes a second insulating substrate 210, the black matrix 211 formed in a lattice shape on the second insulating substrate 210, a color filter 221 with red, green and blue portions. Alternatively, the color filter 221 may have cyan, magenta and yellow portions. The second member 200 further includes a common electrode 231 formed on the color filter and a second alignment layer 241.

The black matrix 211 marks different pixels and is made of a photosensitive organic substance containing a black pigment. The black pigment may be carbon black, titanium oxide or the like. However, the black matrix 211 may be made of a single-layered metal layer of chrome, chrome oxide, chrome nitride and etc. or a multi-layered metal layer compounding thereof, apart from the embodiment.

The black matrix 211 is formed in the lattice shape along the gate line 121 and the data line 141 of the first member 100 and is also formed on the semiconductor layer 132 in order to prevent light from reaching the semiconductor layer 132. A caved-in part 212 is formed on an area corresponding to the column spacer 161 of the first member 100. In the first embodiment, there is substantially no black matrix 211 in the caved-in part 212. On the caved-in part 212 is disposed a polymer layer 300, which will be described in detail later. A form of the caved-in part 212 corresponds to a form of the upper part of the column spacer 161. Further, the area of the caved-in part 212 is preferably wider than the area of the upper part of the column spacer 161 that contacts the caved-in part 212.

The color filter 221 is formed by repeatedly disposing red, green and blue filters or cyan, magenta and yellow filters, and gives colors to light passing through the liquid crystal layer 500. The color filter 221 may be made of a coloring a photosensitive organic substance by pigment distribution using any of the well-known methods.

The common electrode 231 is formed on the overall second member 200 and is made of a transparent conductive substance like ITO (indium tin oxide) or IZO (indium zinc oxide). The common electrode 231 directly applies a signal voltage to the liquid crystal layer 500. The signal voltage applied by the common electrode 231 is usually different from the signal voltage applied by the pixel electrode 152.

A second alignment layer 241 is formed on the common electrode 231. The second alignment layer 241 is usually made of polyimide and is rubbed to align liquid crystal molecules in a predetermined direction.

Here, at least one or both of the first insulating substrate 110 and the second insulating substrate 210 may be made of plastic, such as polycarbon, polyimide, PES, PAR, PEN, PET and etc. Using plastic as the insulating substrates 110, 210 increases the flexibility of the LCD panel 1.

When a plastic substrate is used, processing temperature should be maintained at about 150° C. to about 200° C., which is a general temperature tolerance limit of the plastic substrate. Especially when the plastic substrate is used for the first insulating substrate 110, it is preferable to prevent the temperature from rising above this range during the formation of a metal layer or an inorganic layer.

The polymer layer 300 is disposed between the first alignment layer 171 on the column spacer 161 of the first member 100 and the second alignment layer 241 on the caved-in part 212 of the second member 200. The polymer layer 300 is adhered to the first alignment layer 171 and the second alignment layer 241, respectively, and includes ultraviolet hardening resin like acryl resin. Furthermore, the polymer layer 300 may also include thermo-hardening resin like epoxy resin.

Since the column spacer 161 has a greater area contacting the second member 200 than a plastic spacer having a sphere shape, the first member 100 and the second member 200 are adhered more strongly with the column spacer 161 than with a spherical spacer. Unlike the plastic spacer in a spherical shape, the forming location of the column spacer can be controlled precisely. Thus the two members 100, 200 can be combined with uniform strength using the column spacer. Accordingly, the cell gap of the LCD panel 1 is maintained even if the LCD panel 1 gets bent.

The sealant 400 combining the two members 100, 200 is disposed on the outside of the display area of the LCD panel 1. The sealant 400 is formed along the circumference or edges of the LCD panel 1 and includes ultraviolet hardening resin like acryl resin. Furthermore, the sealant 400 may further comprise thermo-hardening resin like epoxy resin, a hardening agent of amine series, a filler like alumina power and a spacer.

The liquid crystal layer 500 is disposed in a space formed by the two members 100, 200 and the sealant 400 and is aligned according to the voltage difference between the pixel electrode 152 and the common electrode 231.

Hereinafter, a method of making the LCD panel will be described with reference to FIGS. 4a through 4g. The first member 100 may be formed by any of the suitable well-known methods.

Figure 4A:
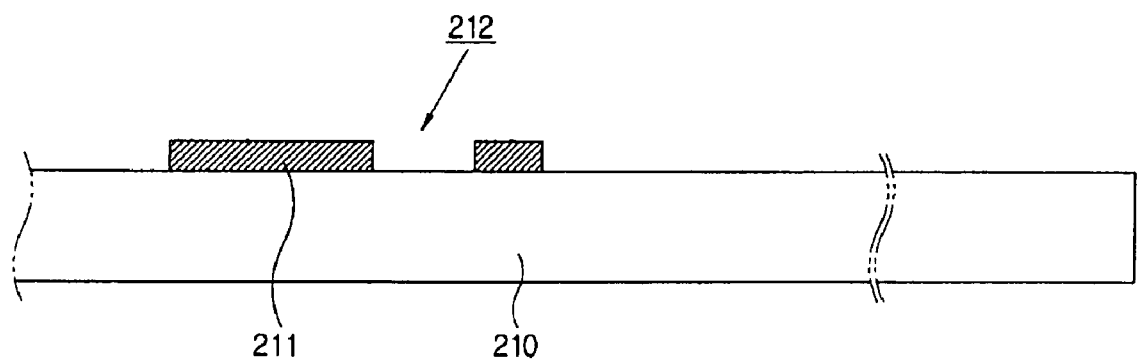
FIGS. 4a through 4g are sectional views showing a method of making the LCD panel according to the first embodiment of the present invention.

First, the black matrix 211 is formed on the second insulating substrate 210, as shown in FIG. 4a. A photoresist of the black matrix is made by adding a black pigment to a photosensitive organic substance. The black pigment may be carbon black or titanium oxide. The black matrix 211 is completed when the second insulating substrate 210 is coated with the photoresist of the black matrix, exposed, developed, and baked. Then, the caved-in part 212 is formed (e.g., by etching) and dispersed in the black matrix 211. Location, size and the number of the caved-in part 212 may vary according to the location, size and the number of the column spacer 161 of the first member 100.

Figure 4B:
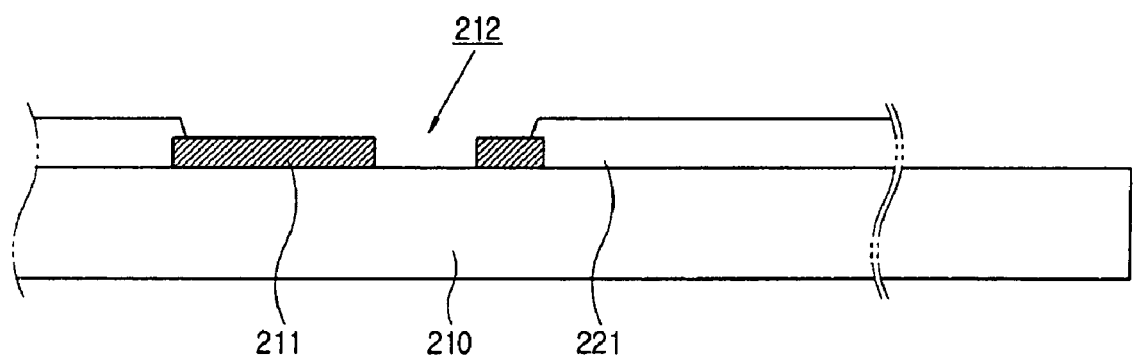

Then, the color filter 221 is formed between the black matrixes 211 as shown in FIG. 4b. The color filter 221 is manufactured by coating, exposure, development and baking. The color filter 221 may be formed by the ink-jet method as well.

Figure 4C:
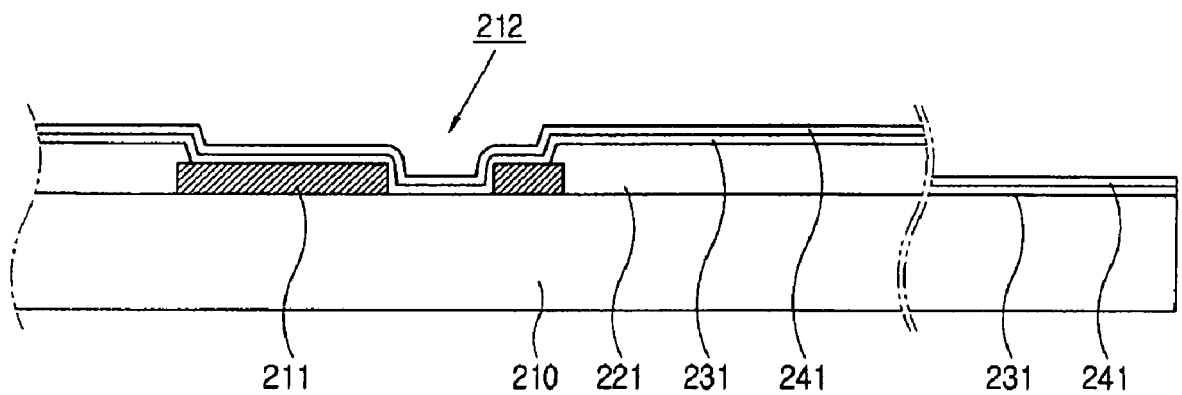

Thereafter, referring to FIG. 4c, on the color filter 221 and the black matrix 211 not covered with the color filter 221 are formed the common electrode 231 and the second alignment layer 241 sequentially, thereby completing the second member 200. As shown, the common electrode 231 and the second alignment layer 241 are partly disposed in the caved-in part 212.

The common electrode 231 is formed by depositing a transparent conductive substance such as ITO (indium tin oxide), IZO(indium zinc oxide), or etc. by the sputtering method.

The second alignment layer 241 is formed as follows. Polyamic acid generally formed by dissolving diamine compound and an anhydride in a solvent is printed on the common electrode 231. Thereafter, polyamic acid is transformed into polyimide through drying, heating and hardening. The polyimide is rubbed and the second alignment layer 241 is completed. Rubbing includes contacting the rubbing cloth with the second alignment layer 241. The rubbing cloth is wrapped around a rubbing roll, which is rotated at high speed. Through this rubbing process, the second alignment layer 241 is transformed in its structure enough to align the liquid crystal molecule in a predetermined direction.

Figure 4D:
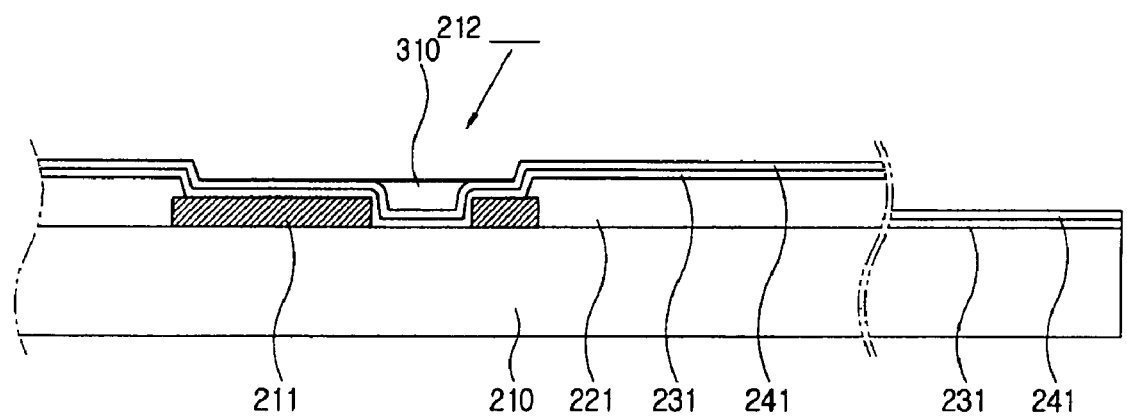

After the second member 200 is prepared, a pre-polymer layer 310 is formed in the caved-in part 212, as shown in FIG. 4d. The pre-polymer layer 310 transforms into the polymer layer 300 by hardening and is adjacent to the second alignment layer 241. The pre-polymer layer 310 may be formed by the ink-jet method and may be stably disposed since formed in the caved-in part 212.

Figure 4F:
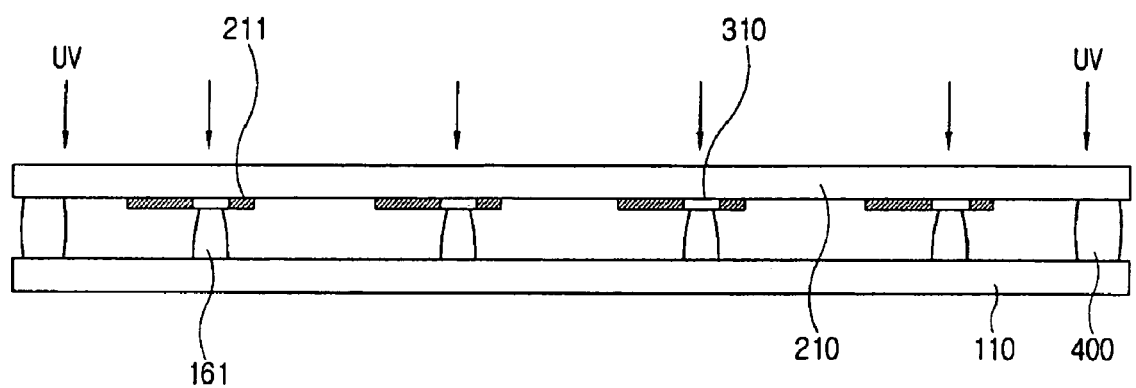
Figure 4E:
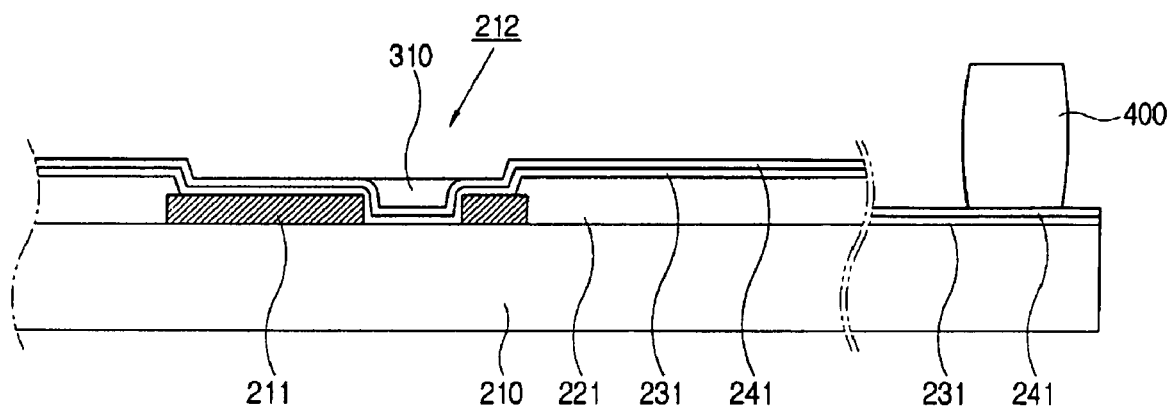
Figure 4G:
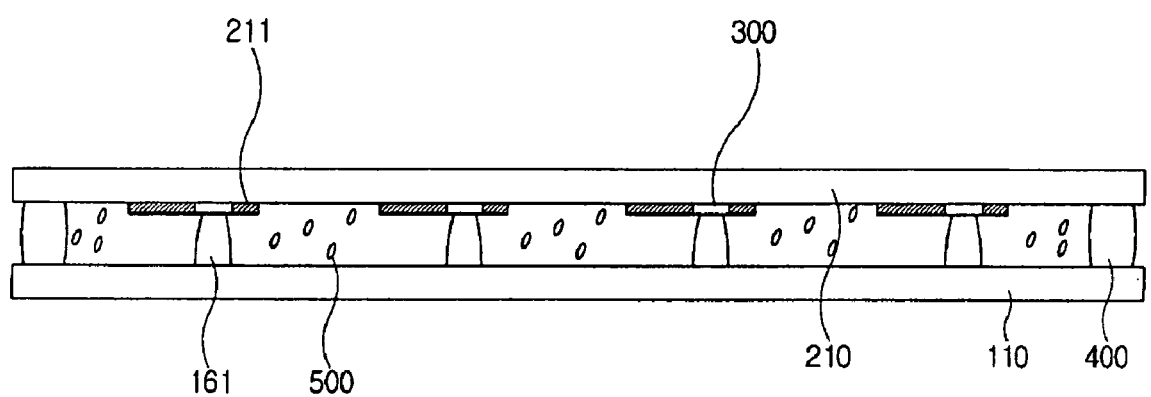

Next, the sealant 400 is formed along the circumference or the edges of the second member 200, as shown in FIG. 4e. The sealant 400 may be formed, for example, by using a screen mask method or a dispense method. The screen mask method is widely used because it is convenient. However, it has some disadvantages such as generation of defects when a mask is contacted with an alignment layer and difficulty of use with large substrates. Therefore, the dispense method is often preferred as the substrate becomes larger. An injection hole (not shown) through which the liquid crystal is injected into the space between the members 100, 200 is formed on the sealant 400.

Thereafter, the first member 100 and the second member 200 are connected, shown in FIG. 4f. Here, the column spacer 161 of the first member 100 is connected to the pre-polymer layer 310. In that state, ultraviolet is applied to the pre-polymer layer 310 to harden it. The pre-polymer layer 310 includes a monomer that polymerizes when exposed to ultraviolet radiation. When the pre-polymer layer 310 is hardened, the sealant 400 is preferably hardened at the same time. Through this process, the first member 100 and the second member 200 are adhered to each other in the display area as well as in the circumference/edge region of the two members.

Then, the liquid crystal layer 500 is formed by injecting the liquid crystal into the space between the two substrates 100, 200 through a filling method. The liquid crystal is injected by using vacuum and a nitrogen pressure. Since the pre-polymer layer 310 is hardened, there is no problem during the liquid crystal injection even though the polymer layer contacts the liquid crystals.

Hereinafter, another method of making the LCD panel according to the first embodiment of the present invention will be described with reference to FIGS. 5a and 5b.

The first member 100 and the second member 200 are manufactured as described above. The injection hole is not formed on the second member 200 when applying the sealant 400.

Figure 5A:
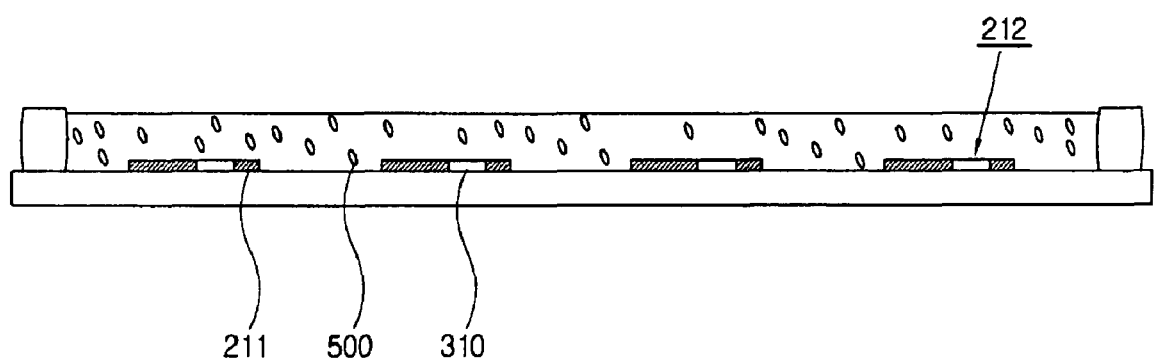
FIGS. 5a and 5b are sectional views showing another method of making the LCD panel according to the first embodiment of the present invention.

In that state, the liquid crystal layer 500 is formed with the dropping method on the second member 200, as shown in FIG. 5a. With the dropping method, it takes less time to form the liquid crystal layer 500 than with the filling method. In the dropping method, the liquid crystal layer 500 is contacted with the pre-polymer layer 310, which is not hardened yet. Therefore, the pre-polymer layer 310 should not be mixed with the liquid crystal layer 500 lest it changes the properties of the liquid crystal layer 500. When forming the liquid crystal layer 500, the sealant 400 may be partly hardened by heating.

Figure 5B:
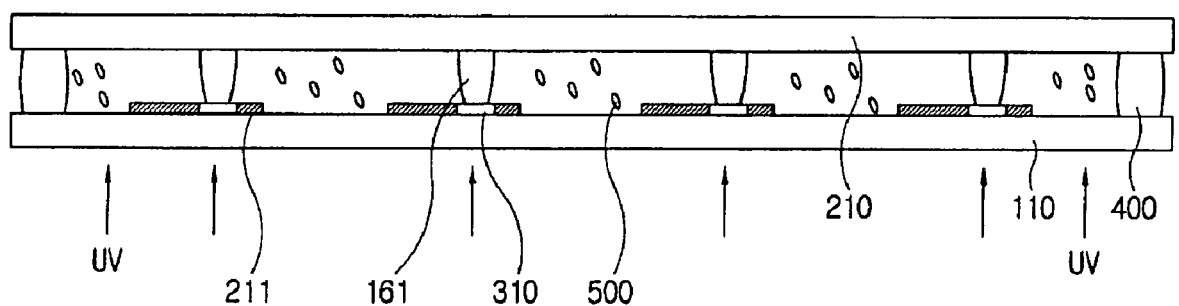

Referring to FIG. 5b, the first member 100 is connected to the second member 200. Here, the column spacer 161 of the first member 100 is connected to the pre-polymer layer 310. In that state, the pre-polymer layer 310 and the sealant 400 are hardened by ultraviolet radiation, thereby completing the preparation of LCD panel 1.

An LCD panel according to a second though a fourth embodiments will be described with reference to FIGS. 6 through 8.

Figure 6:
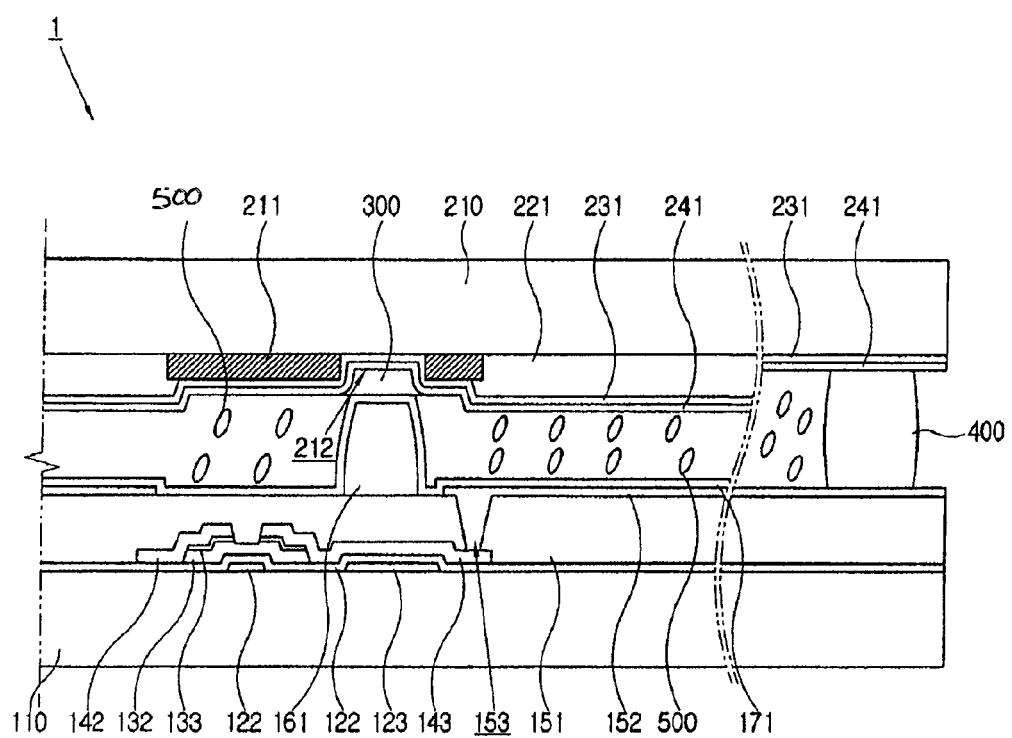
FIG. 6 is a sectional view of an LCD panel according to a second embodiment of the present invention.

In the second embodiment shown in FIG. 6, a metal pattern 123 is formed on the part of a first member 100 that would align with the caved-in part 212 upon assembly with the second member 200. The metal pattern 123 prevents light from leaking due to the caved-in part 212. The metal pattern 123 may be formed to be the same height as a gate line assembly (121, 122) although this is not a limitation of the invention.

There is no liquid crystal layer 500 in an area where the caved-in part 212 is formed because of the presence of the column spacer 161. Light from the rear of the first member 100 passes though the column spacer 161 and a polymer layer 300, and then exits the LCD panel 1. Accordingly, light is leaked and display quality may deteriorate. The metal pattern 123 prevents or at least reduces this light leakage. The metal pattern 123 is preferably formed a little wider than the caved-in part 212.

Figure 7:
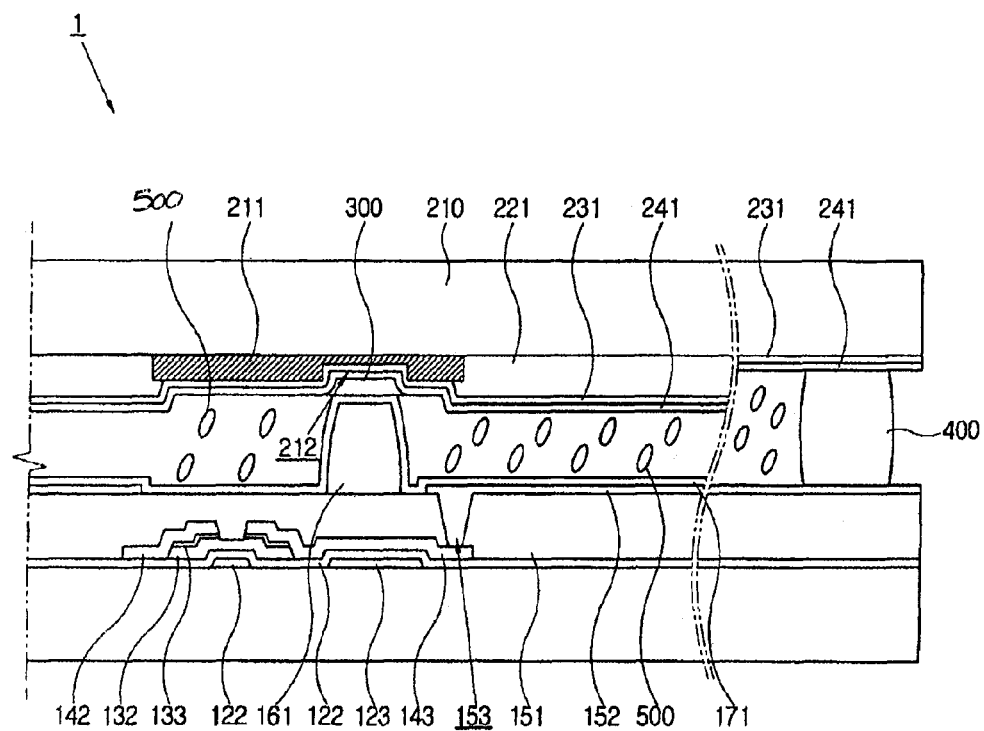
FIG. 7 is a sectional view of an LCD panel according to a third embodiment of the present invention.

In the third embodiment shown in FIG. 7, there is a black matrix 211 in a caved-in part 212. The black matrix 211 in the caved-in part 212 is thinner than the black matrix 211 in the areas surrounding the caved-in part 212. Accordingly, light leakage is prevented or reduced without additional metal pattern 123 like in the second embodiment.

Figure 8:
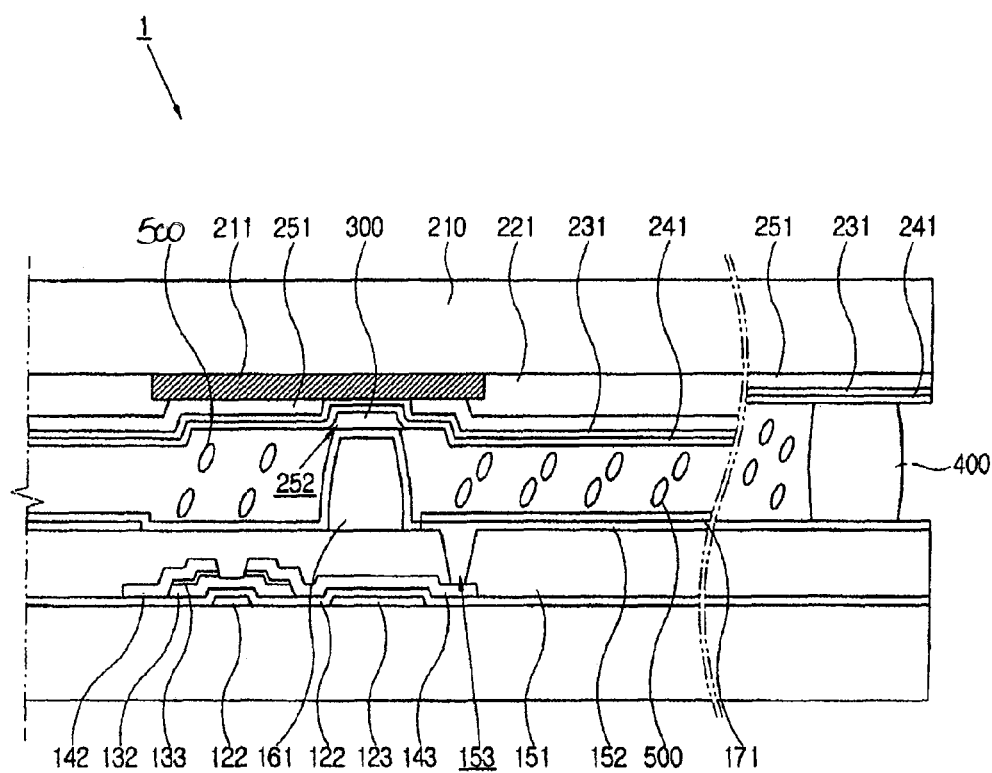
FIG. 8 is a sectional view of an LCD panel according to a fourth embodiment of the present invention.

In the fourth embodiment shown in FIG. 8, a caved-in part 252 is formed on an overcoat layer 251. The overcoat layer 251 covers a color filter 221 and a black matrix 211, which is not covered with the color filter 221. The overcoat layer 251 protects the color filter 221 and may be made of an organic substance. The overcoat layer 251 is removed in the caved-in part 252. The caved-in part 252 is disposed on the black matrix 211 such as to prevent or reduce light leakage. On the overcoat layer 251 are formed a common electrode 231 and a second alignment layer 241.

Although a few embodiments of the present invention have been shown and described, it will be appreciated by those skilled in the art that changes may be made in these embodiments without departing from the principles and spirit of the invention, the scope of which is defined in the appended claims and their equivalents.

What is claimed is:

1. An LCD panel comprising:
 a first member including a column spacer;
 a second member disposed substantially parallel to the first member;
 a polymer layer disposed between the column spacer and the second member, the polymer layer adhering the column spacer to the second member;
 a liquid crystal layer disposed between the first member and the second member; and
 wherein the second member has a caved-in part, the polymer layer being disposed only in the caved-in part.

2. The LCD panel according to claim 1, wherein at least one of the first member and the second member comprises an insulating substrate made of plastic.

3. The LCD panel according to claim 2, wherein a TFT is formed on the first member, and the insulating substrate of the second member is made of plastic.

4. The LCD panel according to claim 1, further comprising a first alignment layer disposed between the column spacer and the polymer layer.

5. The LCD panel according to claim 1, wherein the second member comprises an insulating substrate and a common electrode layer and a second alignment layer which are formed sequentially on the insulating substrate, and wherein the polymer layer is formed on the second alignment layer.

6. The LCD panel according to claim 1, wherein a black matrix is formed on the second member in a lattice pattern and the caved-in part is formed in the black matrix.

7. The LCD panel according to claim 6, wherein the black matrix is removed from the caved-in part.

8. The LCD panel according to claim 6, wherein the black matrix comprises an organic substance.

9. The LCD panel of claim 6, wherein the black matrix has a thin portion and a thick portion and the caved-in part is aligned with the thin portion.

10. The LCD panel according to claim 1, wherein the second member further comprises an overcoat layer and the caved-in part is formed on the overcoat layer.

11. The LCD panel according to claim 1, wherein a metal pattern is formed on an area of the first member that aligns with the caved-in part when the first member and the second member are aligned to reduce light leakage.

12. The LCD panel according to claim 1, wherein the polymer layer comprises acryl resin and epoxy resin.

13. The LCD panel according to claim 1, wherein the polymer layer comprises an ultraviolet hardening resin.

14. The LCD panel according to claim 1, further comprising a sealant combining the first member with the second member, wherein the sealant contains an ultraviolet hardening resin.

15. The LCD panel of claim 1, further comprising:
 a black matrix is formed on the second member in a lattice pattern; and
 an overcoat layer on the black matrix,
 wherein the overcoat layer is removed from an area aligned with the caved-in part.

* * * * *